(12) United States Patent
Grzybowski et al.

(10) Patent No.: US 7,505,650 B1
(45) Date of Patent: Mar. 17, 2009

(54) MICROLENSES FOR OPTICAL ASSEMBLIES AND RELATED METHODS

(75) Inventors: Richard Robert Grzybowski, Corning, NY (US); Stephan Lvovich Logunov, Corning, NY (US); Alexander Mikhailovich Streltsov, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 12/079,804

(22) Filed: Mar. 28, 2008

(51) Int. Cl.
*G02B 6/42* (2006.01)
*G02B 6/32* (2006.01)
*C03B 29/02* (2006.01)

(52) U.S. Cl. .................. 385/33; 385/88; 65/106
(58) Field of Classification Search ............ 385/33–35, 385/88; 65/106
See application file for complete search history.

(56) References Cited

U.S. PATENT DOCUMENTS

| | | | | |
|---|---|---|---|---|
| 4,281,891 A * | 8/1981 | Shinohara et al. | ............ | 385/33 |
| 5,604,635 A | 2/1997 | Lawandy | .................... | 359/620 |
| 5,665,136 A | 9/1997 | Komachi | ..................... | 65/102 |
| 6,706,154 B1 | 3/2004 | Yang et al. | ............. | 204/157.15 |
| 6,931,181 B2 * | 8/2005 | Jewell et al. | ................... | 385/49 |
| 7,152,434 B2 | 12/2006 | Hashimoto et al. | ............ | 65/392 |
| 2007/0201797 A1 | 8/2007 | Grzybowski et al. | .......... | 385/52 |

OTHER PUBLICATIONS

NASA Tech Briefs: Aligning Arrays of Lenses and Single-Mode Optical Fibers; NASA's Jet Propulsion Laboratory, Pasadena, California; Associated Business Publications, Mar. 2004; pp. 1-2.
A Novel Automation Process for Photonic Devices; H. Zhou et al; pp. 1-6; Advanced Packaging; Jan. 2002; Drawing 1 of 1.
Integrated Micro-optical Assemblies for Optical Interconnects; Michael R. Feldman, et al; Digital Optics Corporation, Charlotte, NC.

* cited by examiner

*Primary Examiner*—Jerry T Rahll
(74) *Attorney, Agent, or Firm*—Michael W. Russell; Matthew B. McNutt

(57) ABSTRACT

Microlenses are formed on a substrate having a first absorption within an operational wavelength range, and a second absorption outside the operational wavelength range, wherein the second absorption is greater than the first absorption. One or more waveguides are coupled with a processing light beam having a wavelength outside the operational wavelength range, and the processing light beam is directed through the waveguides to the substrate to locally heat and expand the substrate so as to form microlenses on the substrate surface. The processing light beam is terminated to stop heating of the substrate and fix the microlenses.

25 Claims, 5 Drawing Sheets

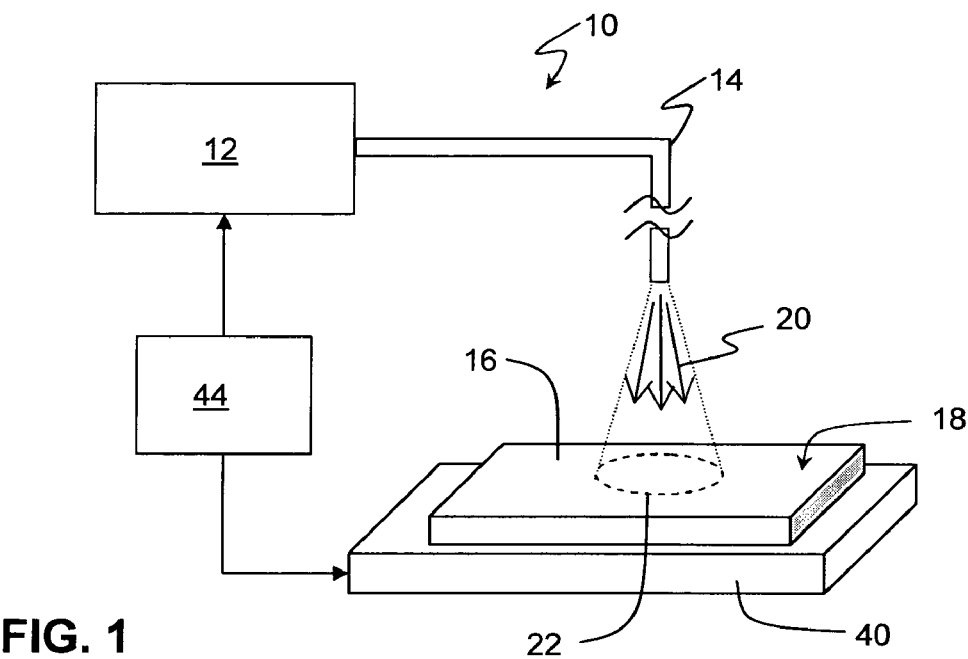
FIG. 1
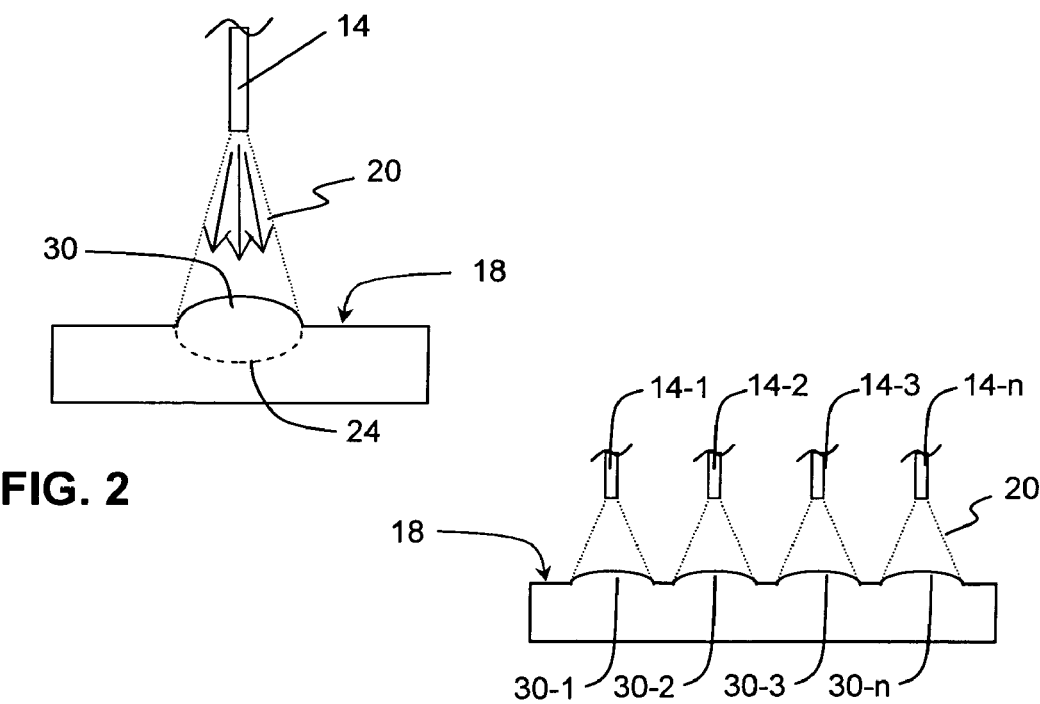
FIG. 2
FIG. 3

MICROLENSES FOR OPTICAL ASSEMBLIES AND RELATED METHODS

FIELD

The present invention relates generally optical communication and optoelectronics, and particularly to formation of microlenses used in optical assemblies.

BACKGROUND

In the fields of optical communication and optoelectronics, the use of micro-lenses for purposes such as such as coupling light from an optical fiber with another optical element is well known. For example, coupling optical fiber arrays to other optical fiber arrays, diode arrays to optical fiber arrays, etc. Typically, a microlens is formed as a convex or concave area on a transparent planar substrate (typically glass or resin) and generally has a diameter of not larger than about 1 mm. In some applications, a plurality of microlenses is arranged on the substrate to form a one-dimensional or two-dimensional microlens array.

A variety of methods for producing microlenses and microlens arrays are known, such as stamping or molding lenses into the substrate, etching the substrate, gluing lenses to the substrate, etc. The substrate may be resin or glass, for example, with the particular substrate material chosen to meet the needed optical, mechanical and chemical properties of a particular application. Depending upon the intended application, microlenses can be formed within a wide range of parameters such as numerical aperture (NA), curvature, diameter etc.

One difficulty with the use of microlenses and microlens arrays is aligning and accurately positioning the lenses for optimal coupling with optical fibers, diodes, and the like. Another difficulty is that to obtain the highest possible coupling efficiency, an aspheric lens is typically required. However, making aspheric lenses is often an expensive process. A cost effective method of creating a microlens and precisely aligning the lens with an optical fiber, diode, or the like would be beneficial.

SUMMARY

One aspect of the invention is a method of forming a microlens on a substrate. In one embodiment, the method comprises the steps of: providing a substrate having a surface, the substrate having a first absorption within an operational wavelength range, and a second absorption outside the operational wavelength range, wherein the second absorption is greater than the first absorption; coupling a waveguide with a processing light beam having a wavelength outside the operational wavelength range; directing the processing light beam through the waveguide to the substrate to locally heat the substrate and cause local expansion of the substrate so as to form a microlens on the substrate surface; and terminating the processing light beam to stop heating of the substrate so as to fix the microlens.

Another aspect of the invention is a method of forming a lens array. In one embodiment, the method comprises the steps of: providing a substrate having a surface, the substrate having a first absorption within an operational wavelength range, and a second absorption outside the operational wavelength range, wherein the second absorption is greater than the first absorption; coupling a plurality of waveguides with a processing light beam having a wavelength outside the operational wavelength range; and directing the processing light beam through the plurality of waveguides to the substrate to locally heat and expand the substrate so as to form a plurality of microlenses on the substrate surface, each of the plurality of waveguides forming a corresponding one of the plurality of microlenses.

Another aspect of the invention is a method for aligning a waveguide with a microlens. In one embodiment, the method comprises: positioning a first end of a waveguide adjacent a substrate; coupling a second end of the waveguide with a processing light beam; and directing the processing light beam through the waveguide to locally irradiate the substrate adjacent the first end of the waveguide, the substrate being absorbing at a wavelength of the processing light beam sufficient to cause local heating and expansion of the substrate so as to form a microlens on the substrate surface adjacent and aligned with the first end of the waveguide.

Another aspect of the invention is an optical assembly. In one embodiment, an optical assembly comprises: a first optical element; and a substrate having at least one microlens formed thereon by expansion of the substrate due to local heating of the substrate in a corresponding at least one location, wherein the first optical element is self-aligned to the at least one microlens.

Additional features will be set forth in the description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments according to the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments according to the invention and together with the description serve to explain the principles and operations of the invention.

BRIEF DESCRIPTION OF THE DRAWINGS

FIG. 1 is a schematic illustration of an exemplary system for forming microlenses in one embodiment according to the invention;

FIG. 2 is a schematic illustration of an individual microlens formed with a processing light beam directed through a waveguide.

FIG. 3 is a schematic illustration of an array of microlenses formed with a processing light beam directed through waveguides.

DETAILED DESCRIPTION

Figure 4:
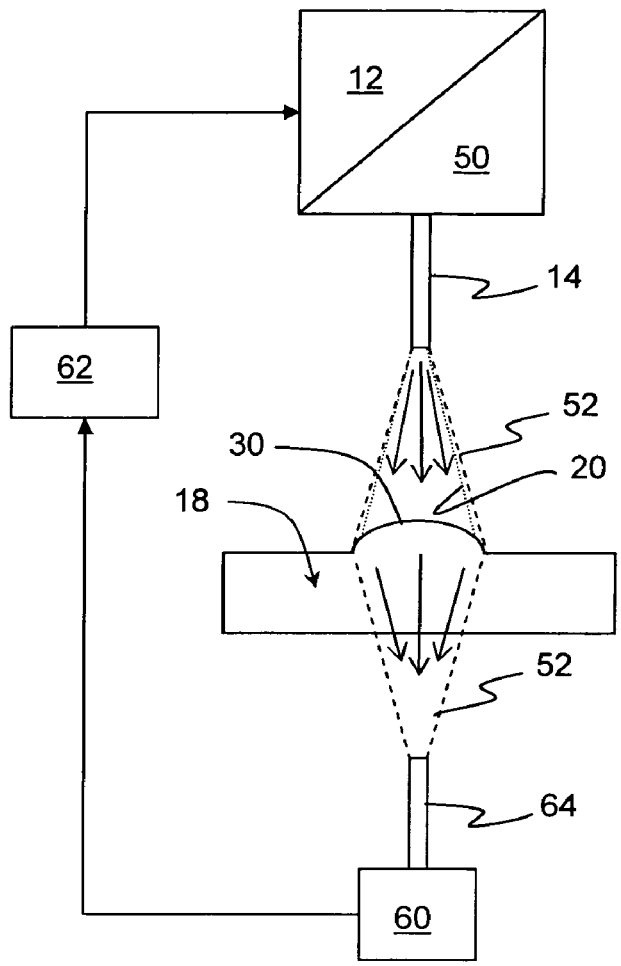
FIG. 4 is a schematic illustration of an individual microlens formed with a processing light beam and an operational light beam directed through a waveguide.

Reference will now be made in detail to embodiments according to the invention, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof relate to the illustrated embodiments as oriented in the figures. However, it is to be understood that the embodiments may assume various alternative orientations and step sequences, except where expressly specified to the contrary. It is also to be understood that the specific devices and processes illustrated in the attached drawings and described in the following specification are embodiments of the inventive concepts defined in the appended claims. Hence, specific dimensions and other physical characteristics relating to the embodiments disclosed herein are not to be considered as limiting, unless the claims expressly state otherwise.

As used herein, the term "microlens" is broadly understood to include optical structures suitable for redirecting (e.g., focusing, concentrating, diverging, collimating and the like) electromagnetic radiation, that is formed at a surface of a substrate, that is integral with and comprised of a material that is substantially the same as a material of the substrate, and that has a diameter that is not larger than about one millimeter (1 mm).

The term "optical element" as used herein is broadly understood to mean any type of optical component, such as an optical fiber, a waveguide, a lens, a microlens, a grating, a beam splitter, etc. Likewise, the term "optical assembly" as used herein includes a system or structure that includes optical elements, whether alone or in combination with other types of elements, such as electrical, electro-optical, electromechanical or mechanical elements.

The term "light" is broadly understood to mean any type of electromagnetic radiation, including but not limited to ultraviolet, near ultra-violet, visible, near-infrared and infrared wavelengths. The phrase "light-absorbing substrate" is understood to mean a substrate that absorbs electromagnetic radiation at an absorption wavelength or range of wavelengths, including but not limited to ultra-violet, near ultraviolet, visible, near-infrared and/or infrared wavelengths, wherein local absorption of the electromagnetic radiation by the substrate at one or more of the absorption wavelengths locally heats the substrate. A light-absorbing substrate may have bands of high and low absorption across the wavelength spectrum.

Referring now to FIG. 1, an exemplary fabrication system 10 for forming microlenses according to the invention is schematically illustrated. Fabrication system 10 includes a processing light source 12 coupled to one end of a suitable waveguide 14, where the other end of the waveguide 14 is in turn configured and positioned to direct a processing light beam produced by source 12 to a surface 16 of a substrate 18, as indicated by processing light beam 20. Surface 16 is the surface at which at least one microlens 18 is to be formed, and substrate 18 comprises a light-absorbing material having wavelength-selective absorption characteristics. The processing light beam 20 produced by source 12, when generated at a suitable wavelength, is absorbed by substrate 18 and causes localized heating of substrate 18. In the present example, this involves directing processing light beam 20 to a localized region of substrate 18 as defined by a beam spot 22 formed by processing light beam 20 on surface 16 of substrate 18. In an example embodiment, processing light beam 20 is divergent as it exits waveguide 14.

The absorption of light from processing light beam 20 by substrate 18 locally heats substrate 18 and raises the temperature of the irradiated portion of substrate 18 in proportion to the intensity of processing light beam 20. As processing light beam 20 is locally absorbed by substrate 18, a limited expansion zone 24 (FIG. 2) is created within which the temperature change causes melting and a decrease in the density of substrate 18. Since expansion zone 24 is constrained by solid regions of substrate 18 surrounding expansion zone 24, the melted material within expansion zone 24 is pushed to flow toward surface 16, thereby forming a "microbump" on surface 16. The microbump functions as a refractive microlens for light. The microlens 30 is fixed by rapid cooling. In an example embodiment, this is accomplished by terminating the irradiation of substrate 18 by processing light beam 20.

It is noted that a detailed description of methods and apparatus relating to the formation of microbumps on glass substrates is set forth in U.S. Patent Publication No. US 2007/0201797 published Aug. 30, 2007, and entitled GLASS-BASED MICROPOSITION SYSTEMS AND METHODS which is hereby incorporated by reference herein in its entirety.

In one embodiment, as illustrated in FIG. 1, substrate 18 can be mounted to a positioning mechanism 40, such as an X-Y stage, so that surface 16 of substrate 18 can be located at a desired position relative to waveguide 14 and processing light beam 20. If desired, positioning mechanism 40 may also include a Z-axis stage for controlling the size of beam spot 22 and, hence, the diameter of microlens 30. A suitable controller 44 is provided for operating positioning mechanism 40 and, optionally, also processing light source 12.

Referring now to FIG. 3, when a plurality of microlenses 30 are to be fabricated as a one-dimensional or a two-dimensional array, a plurality of waveguides 14-1 through 14-$n$ (collectively waveguides 14) can be coupled to one or more processing light source 12, as illustrated in FIG. 1. Processing light beam 20 is then directed through the plurality of waveguides 14 to substrate 18 to locally heat and expand substrate 18 so as to form a plurality of microlenses 30-1 through 30-$n$ (collectively microlenses 30) on surface 16 of substrate 18, in the manner described above. In one embodiment, each of the plurality of waveguides 14-1 through 14-$n$ form a corresponding one of the plurality of microlenses 30-1 through 30-$n$.

Microlenses 30 formed as described above are typically utilized as an optical element in an optical system or assembly, where the optical system or assembly is operated at an operational wavelength, or within an operational wavelength range, at which the material of substrate 18 (and thus microlens 30) is substantially transparent. As used herein, "substantially transparent" is understood to mean substrate 18 has absorption at the operational wavelength, or within the operational wavelength range, sufficiently low enough that local absorption of the electromagnetic radiation by the substrate at the operational wavelength will not locally heat substrate 18 sufficiently to alter the optical characteristics of microlens 30. That is, the processing wavelength is outside of the operational wavelength range.

Referring now to FIG. 4, in one embodiment for forming microlens 30, waveguide 14 is coupled to both processing light source 12 and an operational light source 50, such that waveguide 14 directs both the processing light beam 20 and an operational light beam 52 (i.e., a light beam in the operational wavelength) to substrate 18. In one implementation, the processing light beam 20 and the operational light beam 52 are directed through waveguide 14 consecutively. In another implementation, the processing light beam 50 and the operational light beam 52 are directed through waveguide 14 concurrently. Simultaneously coupling waveguide 14 to processing light source 12 and operational light source 50 permits monitoring transmission of the operational light beam 52 through microlens 30 as microlens 30 is formed. Monitoring transmission of the operational light beam 52 may be accomplished, for example, by use of a photodetector 60 or the like, that is coupled with microlens 30 by another waveguide 64. In one embodiment, operation of the processing light source 12 is controlled by a controller 62 in response to transmission of the operational light beam 52 through microlens 30. In this manner, in one implementation, the processing light source 12 and the associated processing light beam 20 may be terminated when the transmission of the operational light beam 52 through microlens 30 indicates microlens 30 has reached a desired shape. In another implementation, the processing light beam 20 can be controlled during formation of microlens 30 to alter an energy flux into substrate 18 to provide microlens 30 with a desired shape (e.g., an aspherical shape). In one embodiment, photodetector 60 monitors transmission of processing light beam 20 through microlens 30, such as by forming microlens 30 at a first processing light beam power (e.g., 5 W), and then monitoring microlens 30 performance at a lower processing light beam power (e.g., 50 mW).

Figure 5:
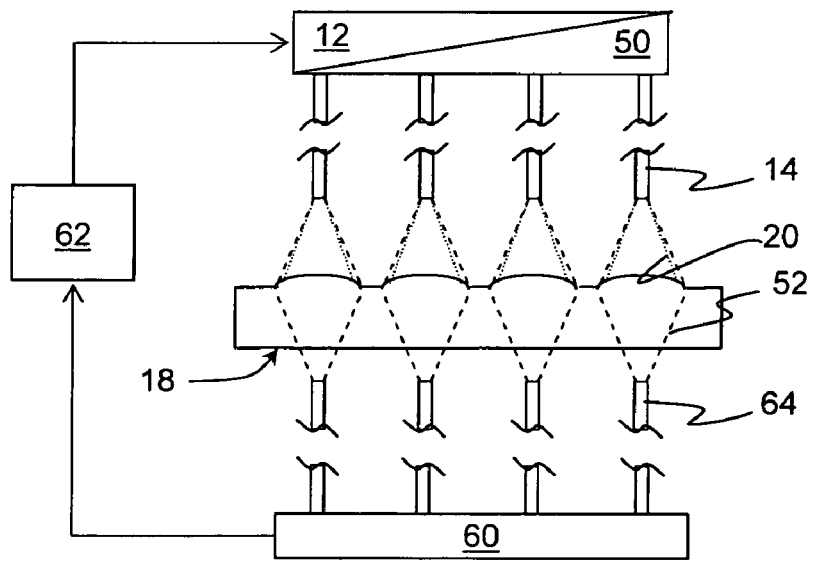
FIG. 5 is a schematic illustration of an array of microlenses formed with a processing light beam and an operational light beam directed through waveguides.

Referring now to FIG. 5, in one embodiment, when a plurality of microlenses 30 are to be formed on substrate 30, one or more of the plurality of waveguides 14 are coupled to both processing light source 12 and operational light source 50, such that each waveguide 14 directs both the processing light beam 20 and an operational light beam 52 (i.e., a light beam in the operational wavelength) to a corresponding location on substrate 18. In one implementation, the processing light beam 20 and the operational light beam 52 are directed through an individual one of waveguides 14 consecutively. In another implementation, the processing light beam 20 and the operational light beam 52 are directed through an individual one of waveguides 14 concurrently. Simultaneously coupling waveguides 14 to processing light source 12 and operational light source 50 permits monitoring transmission of the operational light beam through microlenses 30 as they are formed. Monitoring transmission of the operational light beam may be accomplished, for example, by use of photodetector 60 or the like, that is coupled with microlens 30 by another waveguide 64. In one embodiment, operation of the processing light source 12 while forming an individual one of microlenses 30 is controlled by controller 62 in response to transmission of the operational light beam 52 through the individual microlens 30. In this manner, in one implementation, the processing light beam 20 may be terminated when the transmission of the operational light beam 52 through the microlens 30 indicates the microlens 30 has reached a desired shape. In another implementation, the processing light source 12 can be controlled during formation of an individual one of microlenses 30 to alter an energy flux into substrate 18 to provide the microlens 30 with a desired shape (e.g., an aspherical shape). In one embodiment, the plurality of microlenses 30 includes more than one microlens shape.

Parameters affecting microlens formation and the resulting microlens characteristics (both physical and optical) lie primarily with the composition of substrate 18 (e.g., thermomechanical properties, absorption of substrate 18 at the wavelength of processing light beam 22, and the like), numerical aperture (NA), and the size of beam spot 22 on surface 16, together with the wavelength and power density of processing light beam 20 and duration of the irradiation exposure. Microlenses having various sizes, shapes and optical characteristics can be formed by varying one or more of these factors, alone or in combination. For example, a significant range of microlens diameters, focal distances, curvatures, and heights can be achieved. In embodiments according to the invention, microlens diameters vary from less than about 10 μm to about 1000 μm (1 mm); focal distances vary from infinity to about 20 microns or less; curvatures vary from about 10 μm to about 1 mm; and heights vary from about 10 μm to about 500 μm or more. The curvature of microlens 30 is related to its height and diameter. At longer exposure times, the height of microlens 30 decreases and the numerical aperture (NA) of microlens 30 decreases. Thus, a wide range of microlenses can be obtained by varying exposure time, power of processing light source 12, and/or diameter of processing light beam 20.

Figure 6A:
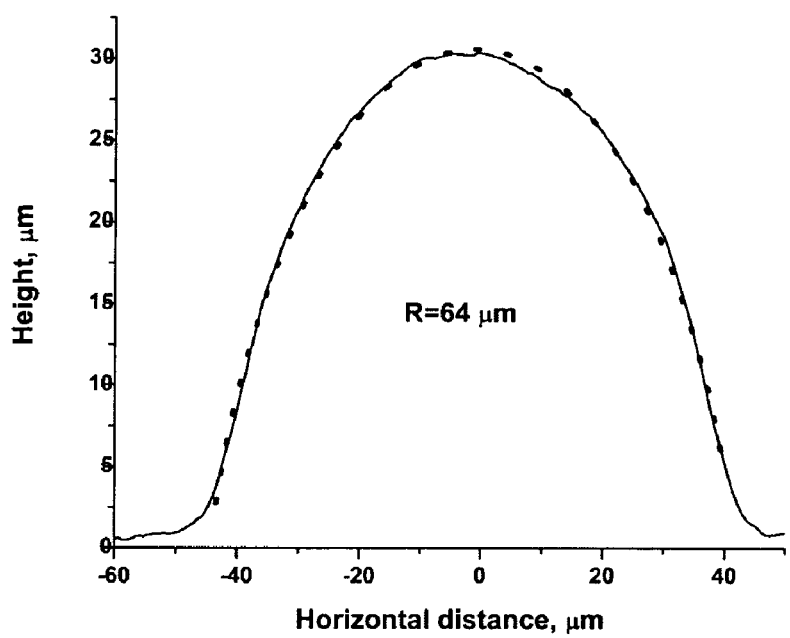
FIGS. 6A and 6B are graphical illustrations showing the near-spherical shape of microlenses formed in accordance with the present invention.
Figure 6B:
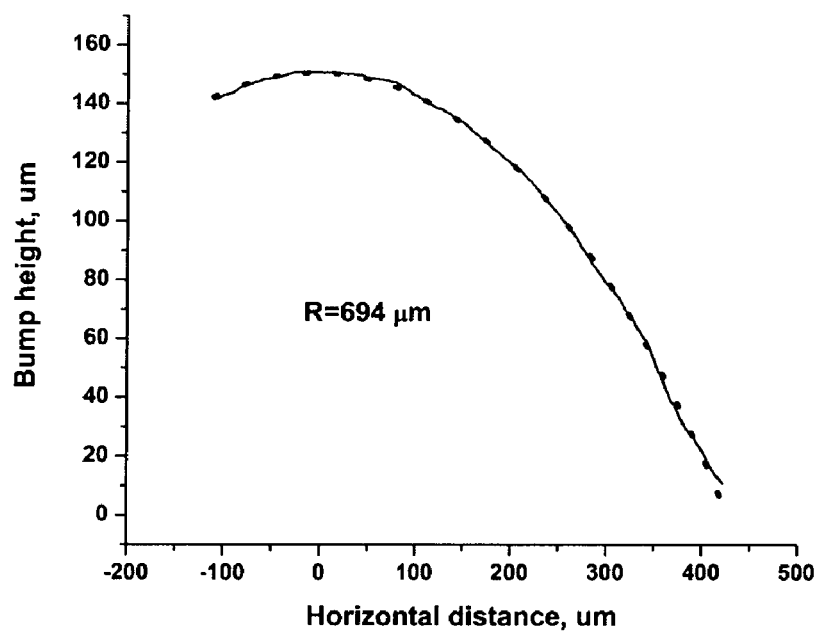

Upon initial formation, the shape of microlens 30 generally approximates a spherical surface since the formation process is related to droplet formation. FIGS. 6A and 6B show the results of fitting line scans of microlenses with a circumference, for microlenses having a radius of curvature R=46 μm in FIG. 6A, and R=694 μm in FIG. 6B. Solid lines are actual profiles and dashed lines are circular fitting curves. FIGS. 6A and 6B demonstrate the near-perfect spherical shape of a microlens formed using the method described herein.

Figure 7:
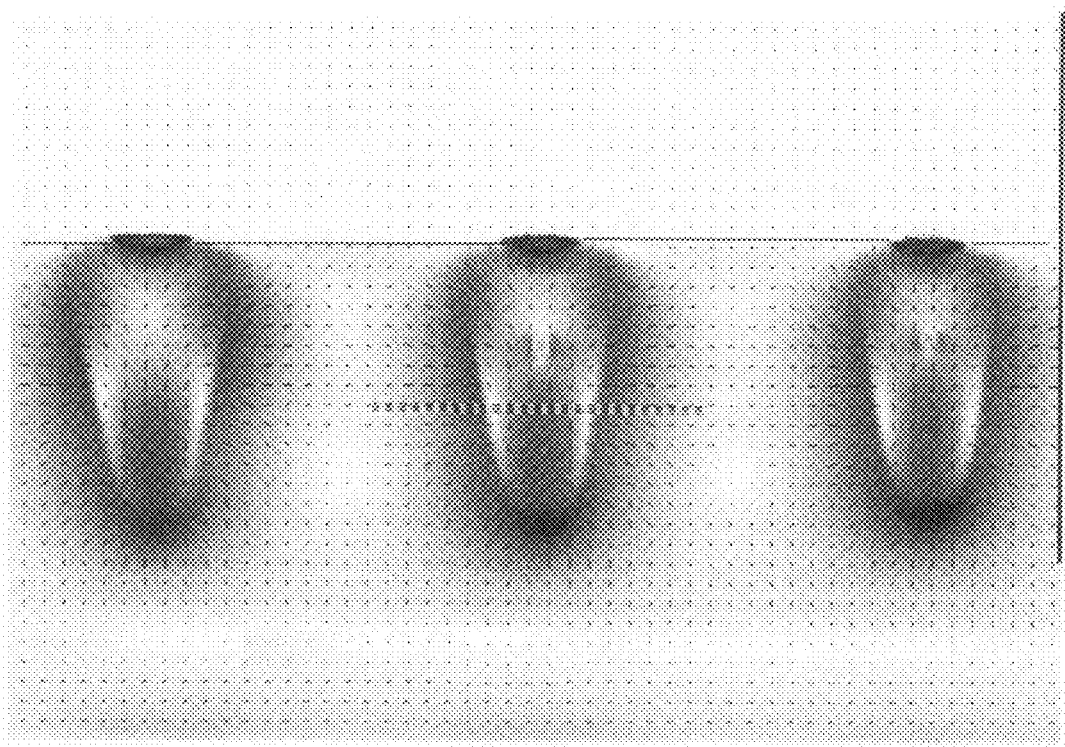
FIG. 7 illustrates the change in refractive index in the substrate and microlenses formed in accordance with the present invention.

In addition to the shape modification of surface 16, there is also stress generated in the microlens 30, as shown in FIG. 7. This stress affects the refractive index of the portion of substrate 18 forming microlens 20 (e.g., the material within expansion zone 24) and may cause lens aberrations. Mach-Zehnder microscope measurements, however, show that the change in the refractive index generated by this stress is only about 0.1% of the bulk material refractive index value and therefore has negligible effect on the optical characteristics of the microlens.

In some embodiments, microlens characteristics may be controlled or varied during the forming process for a single microlens 30, for example, by adjusting the intensity of processing light beam 20, the size and/or shape of beam spot 22, and/or the irradiation duration as microlens 30 is being formed. Additionally, microlens parameters can be modified by additional or secondary exposure of the substrate to processing light beam 20. For example, complex microlens profiles can be formed by first fabricating a relatively large diameter microlens, followed by forming one or more smaller-diameter microlenses on the larger earlier-formed microlens.

In one embodiment, processing light source 12 and operational light source 50 each comprise at least one of a laser, a laser diode, a diode bar, or other type of electromagnetic radiation source. In another embodiment, processing light source 12 and operational light source 50 each provide at least one of an ultraviolet (UV) wavelength (including UVA, UVB and WVC wavelengths), a visible wavelength, a near infrared (NIR) wavelength and an infrared (IR) wavelength. In an example embodiment, ultraviolet wavelengths are less than about 400 nm, visible wavelengths range from about 400 nm to about 750 nm, NIR wavelengths range from about 750 nm to about 1100 nm, and IR wavelengths include wavelengths in the range from about 1100 nm to about 1680 nm. In one embodiment, processing light source 12 provides a processing light beam 20 having an IR wavelength, such as a $CO_2$ laser that emits radiation e.g., at 10.6 μm. In another embodiment, processing light source 12 provides a near infra-red (e.g., 810 nm) wavelength.

In one embodiment, waveguide 14 comprises an optical fiber. In one embodiment, waveguide 14 comprises a single-mode (SM) optical fiber. In another embodiment, waveguide 14 comprises a multi-mode (MM) optical fiber. In one embodiment, waveguide 14 comprises an optical fiber having a diameter of about 125 µm. In one embodiment, waveguide 14 comprises an optical fiber having a core size in the range from about 4 µm to about 80 µm. One exemplary optical fiber is available from Corning Incorporated under the trade designation "SMF-28."

In one embodiment, the light-absorbing material comprising substrate 18 is a glass. In another embodiment, the light-absorbing material comprising substrate 18 is a polymer (e.g., polymethylmethacrylate ("PMMA")). In one embodiment, substrate 18 has a coefficient of thermal expansion (CTE) in the range from about 30 to about 120. In one embodiment, substrate 18 has an annealing point less than about 900° C. In one embodiment, substrate 18 has an annealing point in the range from about 500° C. to about 800° C. In one embodiment, absorption by substrate 18 of the processing light beam 20 wavelength is greater than about 30%, and in one embodiment in the range of about 30% to about 80%. In one embodiment, substrate 18 has absorption in the range of about 50% to about 80% at processing wavelengths in the range of about 800 nm to about 1100 nm. In one embodiment, substrate 18 has absorption at the processing wavelength of greater than about 1 dB per mm. In one embodiment, a microlens 30 formed using substrate 18 has a loss of about 0.1 dB or less, excluding reflection losses, at the operational wavelength.

In one embodiment, substrate 18 includes wavelength-selective dopants for absorbing selected wavelengths. For example, in one embodiment, substrate 18 includes IR-absorbing species such as metal dopants, e.g. Cu, Fe, Co and/or V that cause the substrate to experience a dramatic and local reduction in density when heated rapidly at a given location, resulting in localized expansion of the substrate. In an example embodiment, the depth of expansion zone 24 is changed or made selectable by adjusting the concentration of the absorbing materials in substrate 18. In one embodiment, substrate 18 is an infra-red ("IR") light-absorbing glass, such as glass available from Corning Incorporated of Corning, N.Y., U.S.A under the trade designations "3996" and "4602".

Figure 8:
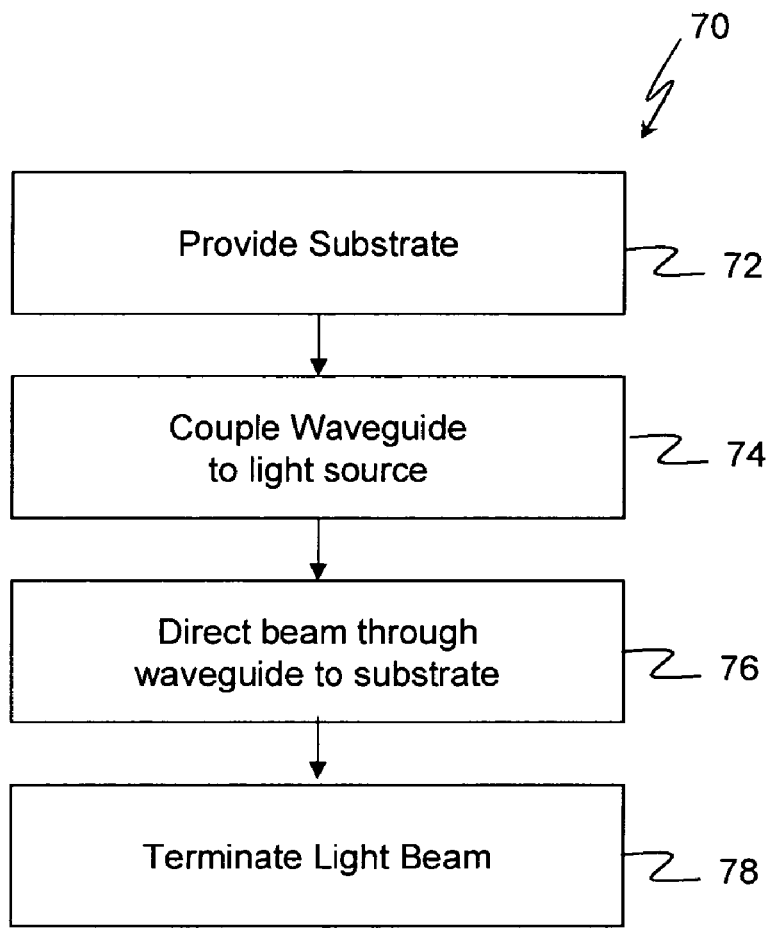
FIG. 8 is a flowchart illustrating a method of forming a microlens or a microlens array according to the present invention.

One embodiment of a method of forming a microlens or a microlens array according to the present invention is depicted in FIG. 8 and generally depicted by reference number 70. The method includes a first step 72 defined by providing a glass substrate having a first absorption within an operational wavelength range, and a second absorption outside the operational wavelength range, wherein the second absorption is greater than the first absorption. A second step 74 is defined by coupling one or more waveguides with a processing light beam having a wavelength outside the operational wavelength range. A third step 76 is defined by directing the processing light beam through the waveguides to the substrate to locally heat the substrate and cause local expansion of the substrate so as to form one or more microlenses on the substrate surface. A fourth step 78 is defined by terminating the processing light beam to stop heating of the substrate so as to fix the microlenses.

Figure 9:
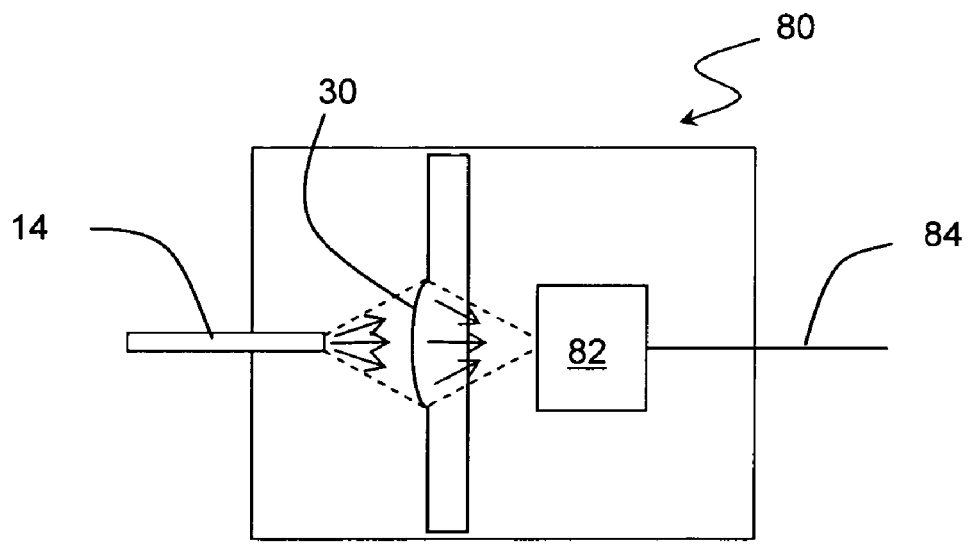
FIG. 9 is a schematic illustration of an optical assembly utilizing a microlens formed in accordance with the present invention.

Referring now to FIG. 9, in one embodiment, after one or more microlenses 30 are formed as described above, substrate 18 having microlenses 30 thereon is utilized as an optical element in an optical assembly 80, where optical assembly 80 is operated at an operational wavelength, or within an operational wavelength range, at which the material of substrate 18 (and thus microlens 30) is substantially transparent. For example, microlens 30 or an array of microlenses 30 can be integrated as desired with other optical or opto-electronic elements 82 (e.g., laser diodes, photodetectors, fiber couplers, and the like) so as to focus or collimate light having an operational wavelength different than the processing wavelength used to form the microlenses. In one embodiment, optical elements 82 may have additional inputs and/or outputs 84.

In one exemplary implementation, an array of microlenses 30 can be coupled with a diode array (e.g., a laser diode bar), so as to concentrate power from the diode array. More particularly, a laser diode bar structure typically emits light in multiple relatively wide stripes arrayed along a straight line. For example, a typical laser diode array may have an overall width of about 1.0 cm with 20 or more emitting segments, where each emitting segment is about 1 µm by 4 µm in cross-section. Thus, the output beam from the laser diode array is undesirably asymmetric and divergent. The array of microlenses 14 can be formed to correct the asymmetry and focus the output of the diode array output.

In one embodiment, one or more of the plurality of waveguides 14 are also optical elements of optical assembly 80 together with microlenses 30, such that subsequent to formation of microlenses 30, waveguides 14 are coupled to an operational light source 50 providing light at an operational wavelength. That is, the same waveguides 14 are used to direct both the processing light beam 20 from processing light source 12 and the operational light beam 52 from the operational light source 50 to substrate 18. Beneficially, use of waveguides 14 to direct both the processing light beam 20 and the operational light beam 52 to substrate 18 precisely self-aligns each of the waveguides 14 with a corresponding microlens 30. In one embodiment, waveguides 14 and substrate 18 are fixed together prior to formation of microlenses 30.

The method described herein substantially simplifies precise alignment of waveguides with corresponding microlenses. This is especially beneficial when large arrays of the lenses are fabricated. In addition, the method described herein does not rely on free-space beam delivery which aids manufacturability because waveguides can be routed in any manner desired and the beam delivery path is therefore not constrained.

From the description provided herein, it will be apparent that any desired arrangement of microlenses may be achieved using the described methods and processes. For example, in one embodiment, microlenses may be formed on both sides of substrate 18, so as to form a double-sided microlens. Further, it will be apparent from this description that microlenses so formed may be further processed, such as by additional processing using the same or different processing light source parameters, by micro-molding microlenses to produce aspherical shapes, and the like. It will further be realized upon reading this disclosure that microlens formation can occur in a vacuum or in an atmosphere selected for influencing the cooling rate and/or other parameters of the molten substrate material.

EXAMPLES

Aspects of the invention will be further understood and clarified by the following examples.

Example 1

A 10 watt Raman, Yb fiber laser operating at a wavelength of 1120 nm (available from IPG Photonics) was directed through a SMF-28 optical fiber (available from Corning Incorporated) having a length of approximately 200 cm onto a substrate of CYR glass (also available from Corning Incorporated). At the 1120 nm wavelength of the processing laser, the substrate has absorption of approximately 50-80%. The output end of the optical fiber was positioned approximately 1.0 from the substrate surface. Using an exposure time of 3 seconds, a microlens having the profile illustrated in FIG. 6A was formed.

Example 2

A 10 watt Raman, Yb fiber laser operating at a wavelength of 1120 nm (available from IPG Photonics) was directed through a SMF-28 optical fiber (available from Corning Incorporated) having a length of approximately 200 cm onto a substrate of CYR glass (also available from Corning Incorporated). At the 1120 nm wavelength of the processing laser, the substrate has absorption of approximately 50-80%. The output end of the optical fiber was positioned approximately 1.5 from the substrate surface. Using an exposure time of 3 seconds, a microlens having the profile illustrated in FIG. 6B was formed.

It will be apparent to those skilled in the art that various modifications and variations can be made without departing from the spirit and scope of the invention. Thus it is intended that the present invention cover the modifications and variations of this invention provided they come within the scope of the appended claims and their equivalents.

What is claimed is:

1. A method of making an optical assembly, the method comprising:
   providing a substrate having a surface, the substrate having a first absorption within an operational wavelength range, and a second absorption outside the operational wavelength range, wherein the second absorption is greater than the first absorption;
   coupling a waveguide with a processing light source and an operational light source, the processing light source outputting a processing light beam having a wavelength outside the operational wavelength range;
   directing the processing light beam through the waveguide to the substrate to locally heat the substrate and cause local expansion of the substrate so as to form a microlens on the substrate surface; and
   terminating the processing light beam to stop heating of the substrate so as to fix the microlens,
   wherein the processing light beam is diverging when it reaches the substrate.

2. A method for forming a microlens comprising the steps of:
   providing a substrate having a surface, the substrate having a first absorption within an operational wavelength range, and a second absorption outside the operational wavelength range, wherein the second absorption is greater than the first absorption;
   coupling a waveguide with a processing light beam having a wavelength outside the operational wavelength range;
   directing the processing light beam through the waveguide to the substrate to locally heat the substrate and cause local expansion of the substrate so as to form a microlens on the substrate surface; and
   terminating the processing light beam to stop heating of the substrate so as to fix the microlens,
   wherein the processing light beam is diverging when it reaches the substrate.

3. The method of claim 2, further comprising:
   coupling the waveguide with an operational light beam having a wavelength within the operational wavelength range; and
   directing the operational light beam through the waveguide to the microlens.

4. The method of claim 3, wherein the steps of directing the processing light beam through the waveguide to the substrate and directing the operational light beam through the waveguide to the microlens occur one of consecutively and concurrently.

5. The method of claim 4, further comprising:
   monitoring transmission of the operational light beam through the microlens as the microlens is formed; and
   controlling operation of the processing light beam in response to transmission of the operational light beam through the microlens.

6. The method of claim 5, wherein the step of terminating the processing light beam occurs when the step of monitoring transmission of the operational light beam through the microlens indicates the microlens has a desired shape.

7. The method of claim 3, wherein the step of directing the operational light beam through the waveguide to the microlens occur after terminating the processing light beam.

8. The method of claim 3, wherein the processing light beam and the operational light beam are each produced by one of a laser and a laser diode.

9. The method of claim 3, wherein the processing light beam and the operational light beam each comprise one of an ultraviolet wavelength, a near-ultraviolet wavelength, a visible wavelength, a near-infrared wavelength, and an infrared wavelength.

10. The method of claim 1, wherein the substrate has an annealing point less than about 900° C.

11. The method of claim 2, wherein directing the processing light beam through the waveguide further comprises:
    controlling the processing light beam to alter an energy flux into the substrate to provide the microlens with an aspherical shape.

12. The method of claim 2, wherein the absorption of the substrate outside the operational wavelength range is greater than about 30 percent.

13. The method of claim 2, wherein the substrate has a coefficient of thermal expansion between about 30 and about 120.

14. The method of claim 2, wherein the microlens has at least one of a curvature in the range from about 10 μm to about 1 mm, a height in the range of about 10 μm to about 500 μm, a diameter in the range from about 10 μm to about 1000 μm, and a focal distances in the range from infinity to about 20 microns.

15. The method of claim 2, wherein directing the processing light beam through the waveguide to the substrate so as to form a microlens comprises forming a microlens on both sides of the substrate.

16. A method for forming a lens array comprising the steps of:
    providing a substrate having a surface, the substrate having a first absorption within an operational wavelength range, and a second absorption outside the operational wavelength range, wherein the second absorption is greater than the first absorption;
    coupling a plurality of waveguides with a processing light beam having a wavelength outside the operational wavelength range; and
    directing the processing light beam through the plurality of waveguides to the substrate to locally heat and expand the substrate so as to form a plurality of microlenses on the substrate surface, each of the plurality of waveguides forming a corresponding one of the plurality of microlenses.

17. The method of claim 16, wherein the plurality of waveguides are one of consecutively coupled with the processing light beam and concurrently coupled with the processing light beam.

18. The method of claim 16, further comprising:
coupling the plurality of waveguides with an operational light beam having a wavelength within the operational wavelength range; and
directing the operational light beam through the plurality of waveguides to the corresponding microlenses.

19. The method of claim 18, wherein for each of the plurality of waveguides, the steps of directing the processing light beam through the plurality of waveguides and directing the operational light beam through the plurality of waveguides occur concurrently.

20. The method of claim 19, further comprising, for each of the plurality of waveguides, controlling operation of the processing light beam in response to transmission of the operational light beam through the corresponding microlens as the microlens is formed.

21. A method for aligning a waveguide with a microlens, the method comprising:
positioning a first end of a waveguide adjacent a glass substrate;
coupling a second end of the waveguide with a processing light beam; and
directing the processing light beam through the waveguide to locally irradiate the substrate adjacent the first end of the waveguide, the substrate being absorbing at a wavelength of the processing light beam sufficient to cause local heating and expansion of the substrate so as to form a microlens on the substrate surface adjacent and aligned with the first end of the waveguide,
wherein the processing light beam is it reaches the substrate.

22. The method of claim 21, further comprising:
coupling the second end of the waveguide with an operational light beam having a wavelength to which the substrate is substantially transparent; and
directing the operational light beam through the waveguide to the microlens.

23. The method of claim 22, wherein the steps of directing the processing light beam through the waveguide and directing the operational light beam through the waveguide occur one of consecutively and concurrently.

24. The method of claim 23, further comprising:
controlling operation of the processing light beam in response to transmission of the operational light beam through the microlens as the microlens is formed.

25. An optical assembly comprising:
a first optical element;
a processing light source,
an operational light source; and
a substrate having at least one microlens formed thereon by expansion of the substrate due to local heating of the substrate in a corresponding at least one location,
wherein the first optical element is self-aligned to the at least one microlens, and the first optical element is coupled to both the processing light source and the operational light source.

* * * * *